US008856821B2

(12) United States Patent
Colby (10) Patent No.: US 8,856,821 B2
(45) Date of Patent: Oct. 7, 2014

(54) DISTRIBUTED SCHEDULING OF MEDIA CHANNEL PLAYOUT (75) Inventor: Christopher Colby, Piedmont, CA (US)

(73) Assignee: MobiTV, Inc., Emeryville, CA (US)

( * ) Notice: Subject to any disclaimer, the term of this patent is extended or adjusted under 35 U.S.C. 154(b) by 1278 days.

(21) Appl. No.: 12/353,922

(22) Filed: Jan. 14, 2009

(65) Prior Publication Data

US 2010/0178030 A1   Jul. 15, 2010

(51) Int. Cl.
*H04N 21/81* (2011.01)
*H04N 21/8547* (2011.01)
*H04N 21/262* (2011.01)
*H04N 5/782* (2006.01)
*H04N 7/16* (2011.01)
*H04N 9/82* (2006.01)
*H04N 5/765* (2006.01)

(52) U.S. Cl.
CPC .............. *H04N 5/782* (2013.01); *H04N 9/8205* (2013.01); *H04N 5/765* (2013.01); *H04N 21/812* (2013.01); *H04N 21/8146* (2013.01); *H04N 21/26258* (2013.01); *H04N 7/165* (2013.01); *H04N 21/814* (2013.01)
USPC ................... 725/32; 725/95; 725/97; 725/116

(58) Field of Classification Search
CPC ................................................ H04N 21/8547
USPC .......................................................... 725/32
See application file for complete search history.

(56) References Cited

U.S. PATENT DOCUMENTS

| | | | | |
|---|---|---|---|---|
| 6,766,357 | B1 * | 7/2004 | Fandozzi | 709/213 |
| 2004/0194131 | A1 * | 9/2004 | Ellis et al. | 725/34 |
| 2010/0011407 | A1 * | 1/2010 | Herlein et al. | 725/146 |
| 2010/0138870 | A1 * | 6/2010 | Anthru et al. | 725/54 |
| 2011/0047567 | A1 * | 2/2011 | Zigmond et al. | 725/32 |

OTHER PUBLICATIONS

Park, SangHoon, et al., "An adaptive media playout for intra-media synchronization of networked-video applications", J. Vis. Commun. Image R. 19 (2008) pp. 106-120, Retrieved from Internet: <http://icserv.kjist.ac.kr/mis/publications/data/2008/JVIS_2008_Feb_SangHoon.pdf> (Accessed May 8, 2013) 15 pgs.

* cited by examiner

*Primary Examiner* — Bennett Ingvoldstad
(74) *Attorney, Agent, or Firm* — Kwan & Olynick LLP (57) ABSTRACT Multiple scheduling producers such as content management systems, advertisement systems, and emergency broadcast systems can independently send scheduling events to scheduling consumers such as streaming servers, guide generators, and playlogs. The scheduling consumers maintain state machines with persistent storage to process scheduling events from scheduling producers and output media channel playlists, channel guides, and/or content. Scheduling producers can contribute independently to define a channel playout while information at scheduling consumers remains synchronized.

20 Claims, 7 Drawing Sheets

DISTRIBUTED SCHEDULING OF MEDIA CHANNEL PLAYOUT

TECHNICAL FIELD

The present disclosure relates to scheduling of content for media channel playout.

DESCRIPTION OF RELATED ART

A media channel includes multiple pieces of media such as video clips and advertisements stitched together to create a continuous, linear flow of content. Examples of content include video clips, television shows, songs, advertisements, etc. However, conventional mechanisms for stitching multiple pieces of media together are limited. In many instances, conventional mechanisms lack flexibility and manageability.

Consequently, it is desirable to provide improved techniques and mechanisms for scheduling content.

BRIEF DESCRIPTION OF THE DRAWINGS

The disclosure may best be understood by reference to the following description taken in conjunction with the accompanying drawings, which illustrate particular embodiments.

DESCRIPTION OF EXAMPLE EMBODIMENTS

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of state machines. However, it should be noted that the techniques of the present invention be applied using a variety of mechanisms. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

Multiple scheduling producers such as content management systems, advertisement systems, and emergency broadcast systems can independently send scheduling events to scheduling consumers such as streaming servers, guide generators, and playlogs. The scheduling consumers maintain state machines with persistent storage to process scheduling events from scheduling producers and output media channel playlists, channel guides, and/or content. Scheduling producers can contribute independently to define a channel playout while information at scheduling consumers remains synchronized.

Example Embodiments

A media channel is generated by stitching individual pieces of content together to create a continuous linear flow of content, referred to herein as a "playout". Examples of content include video clips, television shows, songs, advertisements, emergency broadcast messages, looping playlists of content, etc. Content providers need a way to efficiently manage content in a flexible and dynamic manner. According to various embodiments, content providers need to schedule the starting and/or ending times for content programs, insert advertisements, add filler into blank spaces between content, cut between content programs, preempt currently scheduled content for higher priority content, etc.

A scheduler is a system that receives content and schedule information specified by the content providers and determines the playout for each channel. In many instances, the playout is expressed as a timed sequence of programs.

According to various embodiments, a system is provided to allow any number of scheduling producers such as content provider and content management systems, advertising systems, and emergency broadcast systems the ability to independently contribute to a channel schedule. The system composites content to produce a single playout for the channel. For example, one scheduling producer might contribute regularly scheduled programming, while a second producer contributes the advertisements that should be inserted, and a third producer contributes preemptive emergency programming. In some examples, scheduling producers provide time stamped scheduling events to scheduling consumers.

According to various embodiments, a content provider (CP) accesses a content management system (CMS) and modifies a playlist for a particular channel. In particular embodiments, the content provider accesses a content management system and schedules a playlist for some channel to start looping at a particular time in the future. In other embodiments, the content provider accesses the content management system and restricts availability of a clip at some time interval in the future as a clip finishes transcoding at the content management system. In still other embodiments, an advertising system selects an advertising clip for insertion into the next available advertising slot in some channel.

Scheduling events are conveyed to scheduling consumers using a messaging service such as Java Messaging Service (JMS). The messaging service reliably transmits messages between two components. Scheduling events may identify playlists, content identifiers, timing information, actions, etc. Scheduling producers independently transmit scheduling events to scheduling consumers.

According to various embodiments, there are any number of scheduling consumers. Examples of scheduling consumers include guide generators that create continuously updated channel guides, playlogs that maintain a database of entire clip sequences played out for each channel, content provider management systems that allow content providers to analyze playout of content and advertisements, and streaming servers that use scheduling events to send clips to individual client devices such as mobile phones and computer systems. Each scheduling consumer can look ahead to see what programming is coming up and, if necessary, continue to play out the channel even if the scheduling consumer loses network connectivity to receive further incoming schedule data.

In particular embodiments, each scheduling consumer has a state machine (SM) that turns the stream of scheduling events into a playout for each channel. A playout is a timestamped sequence of clips that should play out for that particular channel. In particular embodiments, the state machine maintains a variety of data structures in persistent storage. According to various embodiments, the state machine maintains information about the available playlists, when/how each playlist is scheduled to play, and the availability interval of each clip in a playlist. The state machine state also includes a timestamped "playhead" for each channel representing a point in time during the channel's playout. The state machine also recognizes the point in time when one clip in a channel playout will end and the next one should begin.

According to various embodiments, the state machine consumes scheduling events in chronological order, modifies state variables in response to those scheduling events, and outputs the sequence of clips for each channel. In some examples, the state machine prioritizes scheduling events. According to various embodiments, the system beneficially allows multiple scheduling consumers to unroll each channel into identical playouts. According to various embodiments, each scheduling event is post-timestamped by a commitment interval chosen to be long enough to exceed the latency of the scheduling event delivery mechanism. Secondly, an SM that falls behind, for example due system or network failure, will detect this when it receives the first out-of-order scheduling event, at which point it will resynchronize itself. Finally, a scheduling consumer that needs to synchronize itself either because it is starting up for the first time or because it experienced an outage, can initialize itself by copying the state machine state from any other state machine available on the network.

A benefit to this model of clip scheduling is that any scheduling consumer, at any time, is able to look ahead in order to approximate a channel playout out to a time arbitrarily far in the future. This provides both functionality and fault-tolerance. In particular embodiments, a guide generator can determine what is going to play for the next 24 hours and show that schedule to an end-user, barring unforeseen events such as a content provider making a late-breaking schedule change or an emergency broadcast preempting a regularly scheduled program. In another example, a streaming server can continue to play out all channels even if it becomes temporarily unable to receive new scheduling events.

Another benefit is that the model permits multiple scheduling producers to contribute independently to define a channel's playout. For example, an asset management system could be designed as a single scheduling producer responsible only for clip uploads. Separately, a content provider might interact with a content management system user interface that would operate as a second scheduling producer to define playlists and schedule them for playout. An advertising server might operate as a third scheduling event producer that inserts advertisements into a channel without knowing any details about how the content provider has scheduled the playlists for that channel. The state machine semantics are designed to permit this kind of distributed schedule compositing in order to allow independent contribution.

For example, the content provider does not need to know when the advertising breaks are, or for how long, and by the same token the advertising server does not need to know what the non-advertising clips are or how they are scheduled for playout.

According to various embodiments, preemptive scheduling is also allowed. An emergency broadcast or late-breaking news item could preempt a currently scheduled program. A set of scheduling events for the preemptive content could be sent out in real time to interrupt currently scheduled content. When the emergency broadcast or late-breaking news program is over, the system can automatically fall back to the regularly scheduled programming.

Figure 1:
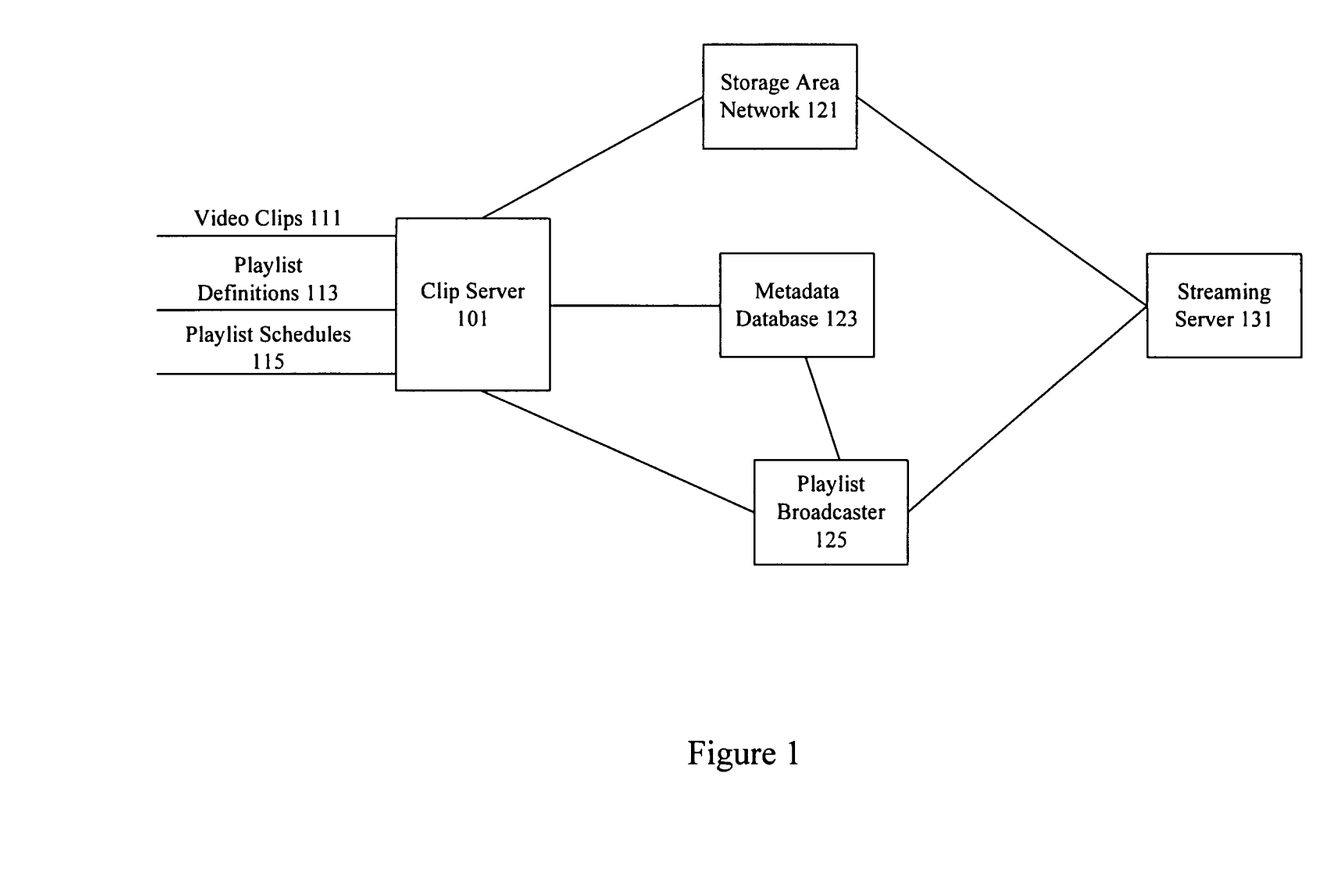
FIG. 1 illustrates one example of a system for scheduling content.

FIG. 1 is a diagrammatic representation illustrating one example of a clip distribution system. According to various embodiments, a clip server 101 receives video clips 111, playlist definitions 113, and playlist schedules 115 from various content sources. In particular embodiments, playlist definitions 113 identify a number of clips included in various playlists. Playlist schedules 115 indicate that a playlist will loop at a particular time. The clip server sends clips such as video clips to a storage area network 121. Playlist schedules and definitions are sent to a metadata database 123. A playlist broadcaster 125 accesses the metadata database 123 to write files to a streaming server 131. In particular embodiments, the files direct a streaming server to play clip A at 5:00, clip B at 5:01, clip C at 5:03, etc. The streaming server 131 then accesses the storage area network 121 to obtain clips A, B, and C.

However, this architecture provides limited ability for content providers to manage content or change content. For example, if a content provider decides to provide alternate programming at 5:01, it can not easily convey this to the streaming server 131. Content from various sources can also not easily be aggregated. Advertising can not easily be inserted into a playout without intervention by a content provider. Furthermore, if the streaming server 131 loses a connection with the playlist broadcaster 125, the streaming server 131 is unable to determine what to play next.

Consequently, a system is provided to allow any number of scheduling producers such as content providers, content management systems, advertising systems, and emergency broadcast systems to independently manage scheduling provided to multiple scheduling consumers such as streaming servers, guide generators, content provider management systems, playlogs, etc.

Figure 2:
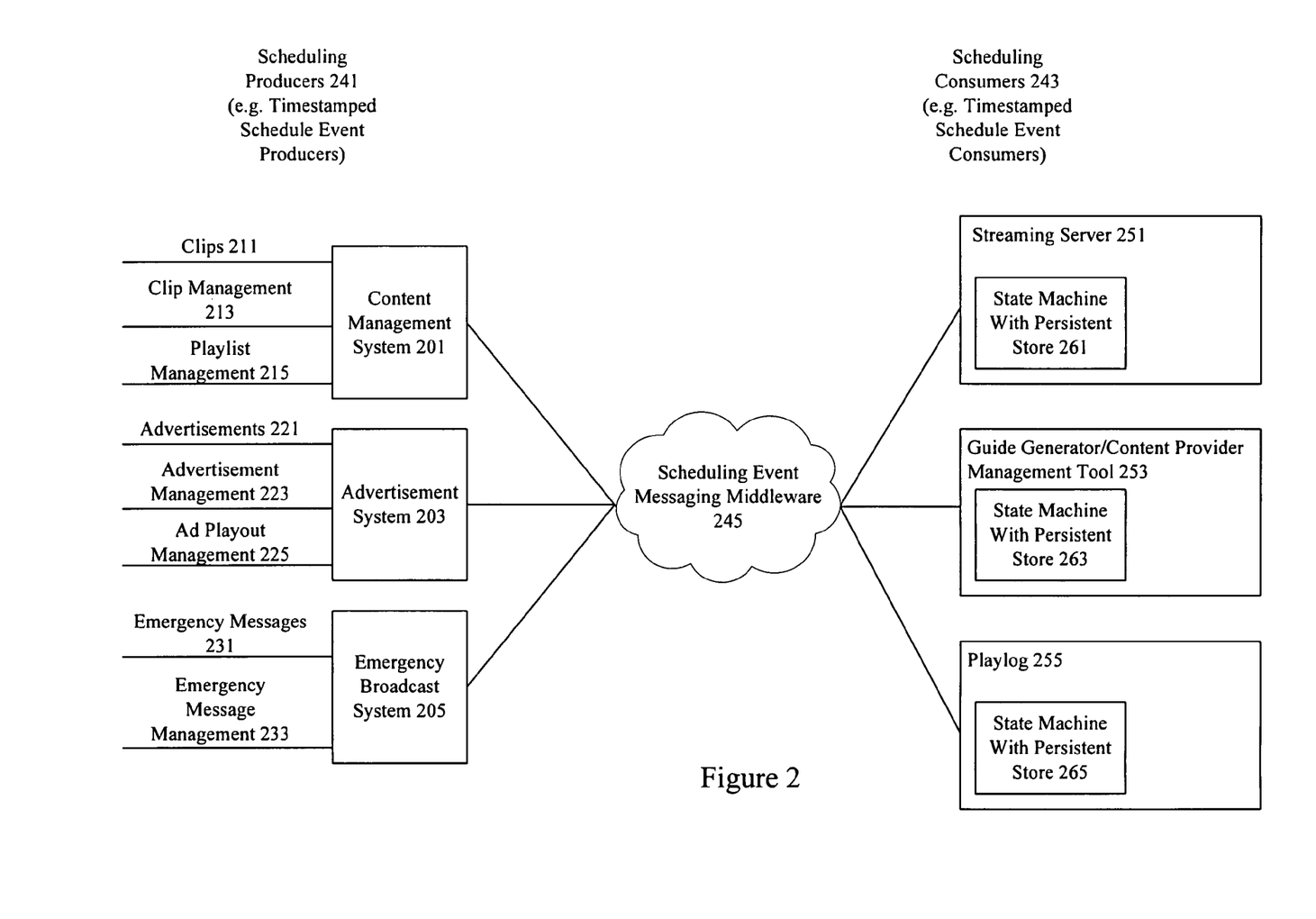
FIG. 2 illustrates one example of a distributed system for scheduling content for media channel playout.

FIG. 2 illustrates one example of a system having multiple scheduling producers independently managing schedules provided to multiple scheduling consumers. According to various embodiments, scheduling producers 241 include content management system 201, advertisement system 203, and emergency broadcast system 205. In particular embodiments, scheduling producers are timestamped schedule event (TSE) producers. According to various embodiments, a content provider sends clips 211, clip management messages 213, and playlist management messages 215 to a content management system 201. Clips 211 may include video clips, songs, messages, television shows, etc. Clip management messages 213 may indicate when a clip should be made available. Playlist management messages 215 may indicate how to create, modify, or delete a playlist or when to schedule playout. Each scheduling event may be used to update an existing schedule at a scheduling consumer.

An advertiser can send advertisements 221, advertisement management messages 223, and advertisement playout management messages 225 to an advertisement system 203. Advertisement management messages 223 and advertisement playout management messages 225 may include rules indicating that advertisements should be played a particular number of times at a specific time period. According to various embodiments, public agencies send emergency messages 231 and emergency message management instructions 233 to an emergency broadcast system 205. The emergency message management instructions 233 may direct scheduling consumers to repeat emergency messages a certain number of times.

Scheduling event messaging middleware 245 reliably sends scheduling events such as timestamped schedule events (TSEs) to scheduling consumers. According to various embodiments, the scheduling event messaging middleware 245 uses Java Messaging Service (JMS). Scheduling events may include playlists, content identifiers, timing information, actions, etc. The scheduling events are transmitted to scheduling consumers 243. According to various embodiments, scheduling consumers include streaming server 251, guide generator/content provider management tool 253, and playlog 255. According to various embodiments, streaming server 251 includes a state machine with a persistent store 261 that is continuously updated as scheduling events are received. The state machine 261 has logic for prioritizing scheduling events and dynamically modifying output as scheduling events are received. According to various embodiments, the streaming server 251 also has accessed to a storage area network to transmit clips corresponding to scheduling events.

A guide generator/content provider management tool 253 also has a state machine with a persistent store 263. The guide generator/content provider management tool 253 receives scheduling events to provide continuously updated guides. Instead of having static guides generated by content providers, the guide generator/content provider management tool 253 can provide continuously updated guides that can include information on advertisements, breaking news, emergency broadcast messages, as well other clip content. Content providers can analyze guide generator 253 output to determine not only when content was played, but what commercials were interspersed and what messages may have interrupted the content. A playlog 255 also includes a state machine with a persistent store 265.

According to various embodiments, the state machines 261, 263, and 265 all have the same logic and the same state and may be used to synchronize each other. In some examples, minor variations in state may occur temporarily, but it is recognized that minor variations in state do not significantly impact system performance. A playlog 255 maintains a full listing of playout content for review and analysis. According to various embodiments, the state machines 261, 263, and 265 output playlists indicating that clip A should be played at 5:00, clip B should be played at 5:30, etc. If a streaming server 251 loses a connection with the messaging middleware 245, the streaming server 251 can still play clips using its existing state information. In particular embodiments, new TSEs are received continuously, and guides and playlogs are updated continuously.

Figure 3:
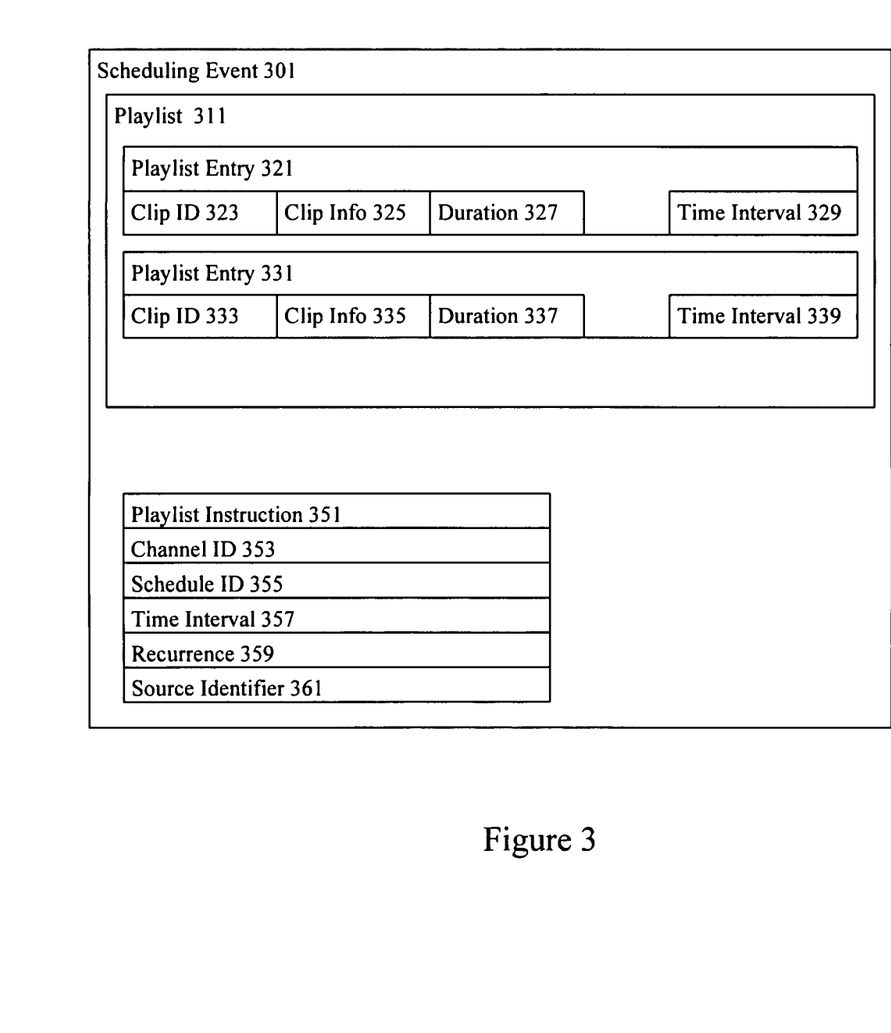
FIG. 3 illustrates one example of a scheduling event.

FIG. 3 illustrates one example of a scheduling event. According to various embodiments, scheduling events such as TSEs are reliably transmitted from scheduling producers to scheduling consumers. In particular embodiments, the scheduling events include information for managing clips, playlists, and characteristics associated with clips and playlists. A variety of scheduling event formats can be used. According to various embodiments, a scheduling event 301 includes a playlist 311. The playlist 311 includes playlist entry 321 and playlist entry 331. Playlist entry 321 includes clip ID 323, clip info 325, duration 327, as well as a time interval 329 when the entry 321 should be played. Playlist entry 331 includes clip ID 333, clip info 335, duration 337, and a time interval 339 when the entry 331 should be played. In particular embodiments, the scheduling event 301 also includes a playlist instruction 351 such as initiating play of the playlist. The channel ID 353 identifies a channel associated with the scheduling event 301. The schedule ID 355 depicts the schedule. The time interval 357 indicates when a particular playlist 311 should be played. Recurrence 359 directs a scheduling consumer to repeat a particular piece of content. According to various embodiments, a source identifier 361 is also provided to identify the source of the scheduling event. The source identifier 361 may be evaluated when prioritizing scheduling events.

Figure 4:
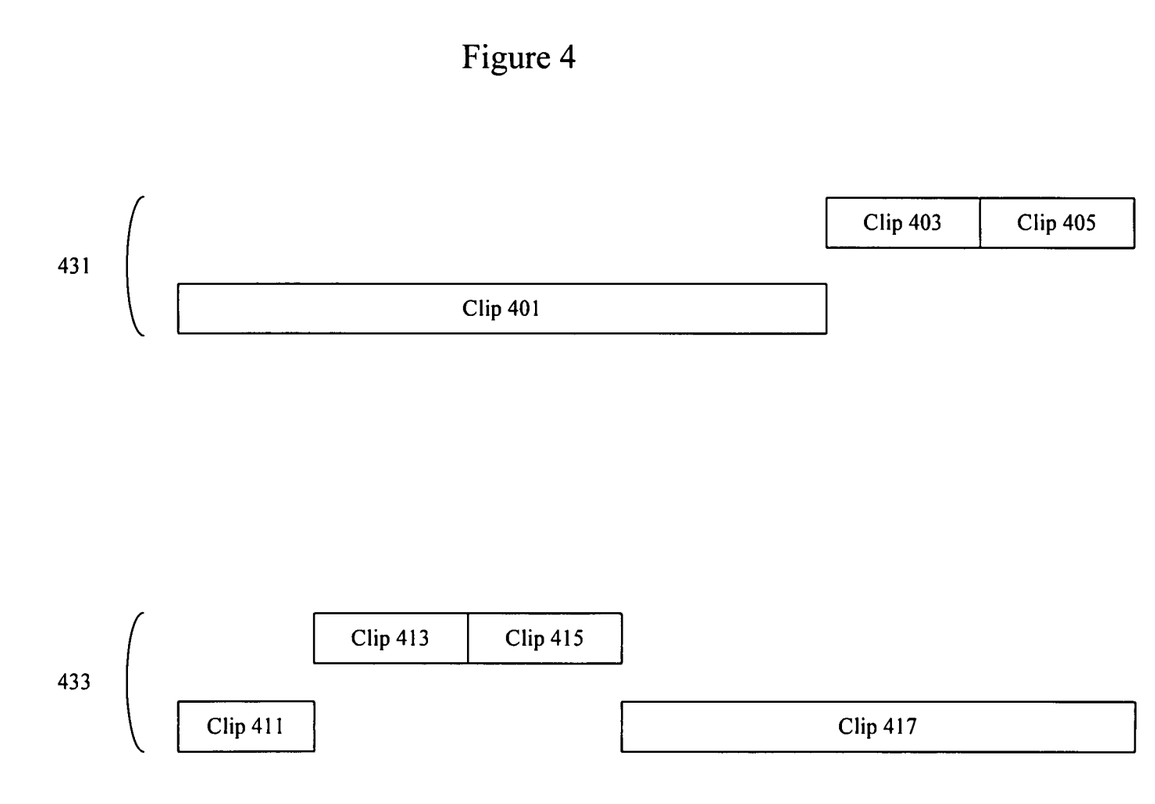
FIG. 4 illustrates one example of clip management.

FIG. 4 illustrates one example of clip management. According to various embodiments, state machines associated with various scheduling consumers have semantics of preemption. In available implementations, clips do not begin to play until a previous clip has finished playing. By contrast, the techniques of the present invention allow new clips to preempt existing clips if necessary. Alternatively, new clips may still be delayed until prior clips have finished playing. A playout 431 includes clip 401, 403, and 405. According to various embodiments, a clip 401 may be a television show while clips 403 and 405 may be advertisements. In one implementation, a clip 403 is scheduled to begin playing while a clip 401 is still playing. However, the clip 403 is delayed until clip 401 completes playing. With preemption, a clip 413 interrupts a show including clips 411 and 417 and delays portion 417. A show is split into clip 411 and 417 with intervening commercial clips 413 and 415 for playout of content flow 433.

Figure 5:
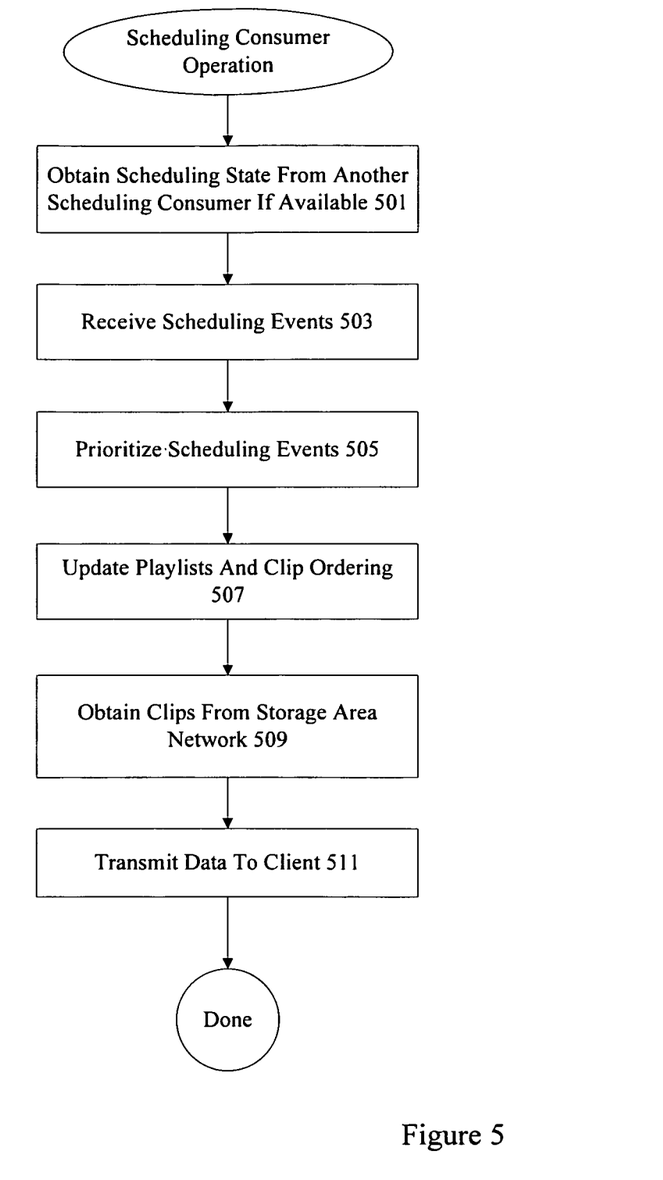
FIG. 5 illustrates one example of operation of a consumer of scheduling events.

FIG. 5 illustrates one example of scheduling consumer operations. At 501, a scheduling consumer obtains scheduling state from another scheduling consumer if available. According to various embodiments, the state is obtained at startup or after system interruption. At 503, scheduling events are received from multiple scheduling producers. At 505, scheduling events are prioritized. In some examples, TSEs from particular scheduling producers are given high priority while ones from other scheduling producers are given low priority. In particular embodiments, emergency broadcast system TSEs are assigned the highest priority while advertising is assigned the next highest priority. Various advertisers may also pay different rates to obtain different priority levels for their advertisements. At 507, playlists and clip ordering are updated. According to various embodiments, state machine logic is used to update playlists and clip ordering. At 509, clips are obtained from a storage area network as needed. At 511, data is transmitted to a client. Data may include program guides, playout streams, playlogs, etc.

Figure 6:
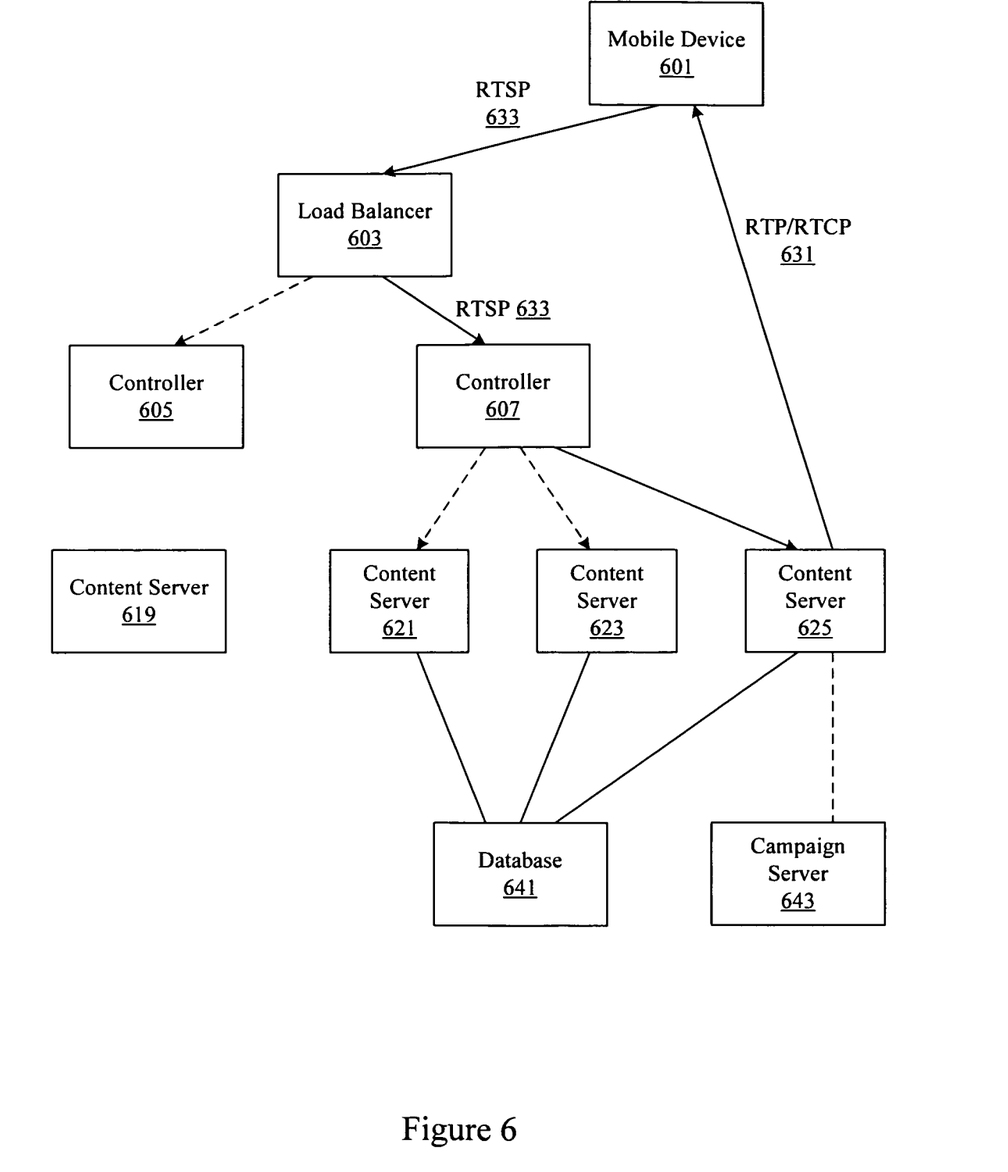
FIG. 6 illustrates one example of streaming server system.

FIG. 6 is a diagrammatic representation illustrating one example of a system that can use the techniques and mechanisms of the present invention to send out data. According to various embodiments, streaming servers 619, 621, 623, and 625 are configured to provide media content to a mobile device 601 using protocols such as RTP and RTCP. Although a mobile device 601 is shown, it should be recognized that other devices such as set top boxes and computer systems can also be used. In particular examples, the streaming servers 619, 621, 623, and 625 can themselves establish sessions with mobile devices and stream video and audio content to mobile devices. However, it is recognized that in many instances, a separate controller such as controller 605 or controller 607 can be used to perform session management using a protocol such as RTSP. It is recognized that streaming servers require the bulk of the processing power and resources used to provide media content mobile devices.

By separating out content streaming and session management functions, a controller can select a streaming server geographically close to a mobile device 601. It is also easier to scale, as streaming servers and controllers can simply be added as needed without disrupting system operation. A load balancer 603 can provide further efficiency during session management using RTSP 633 by selecting a controller with low latency and high throughput.

According to various embodiments, the streaming servers 619, 621, 623, and 625 have access to a campaign server 643. The campaign server 643 provides profile information for various mobile devices 601. In some examples, the campaign server 643 is itself a streaming server or a controller. The campaign server 643 can receive information from external sources about devices such as mobile device 601. The information can be profile information associated with various users of the mobile device including interests and background. The campaign server 643 can also monitor the activity of various devices to gather information about the devices. The streaming servers 619, 621, 623, and 625 can obtain information about the various devices from the campaign server 643. In particular examples, a streaming server 625 uses the campaign server 643 to determine what type of media clips a user on a mobile device 601 would be interested in viewing.

In one example, a mobile device 601 requests a particular stream. A controller 607 establishes a session with the mobile device 601 and the streaming server 625 begins streaming the content to the mobile device 601 using RTP 631. In particular examples, the streaming server 625 obtains profile information from campaign server 643.

Figure 7:
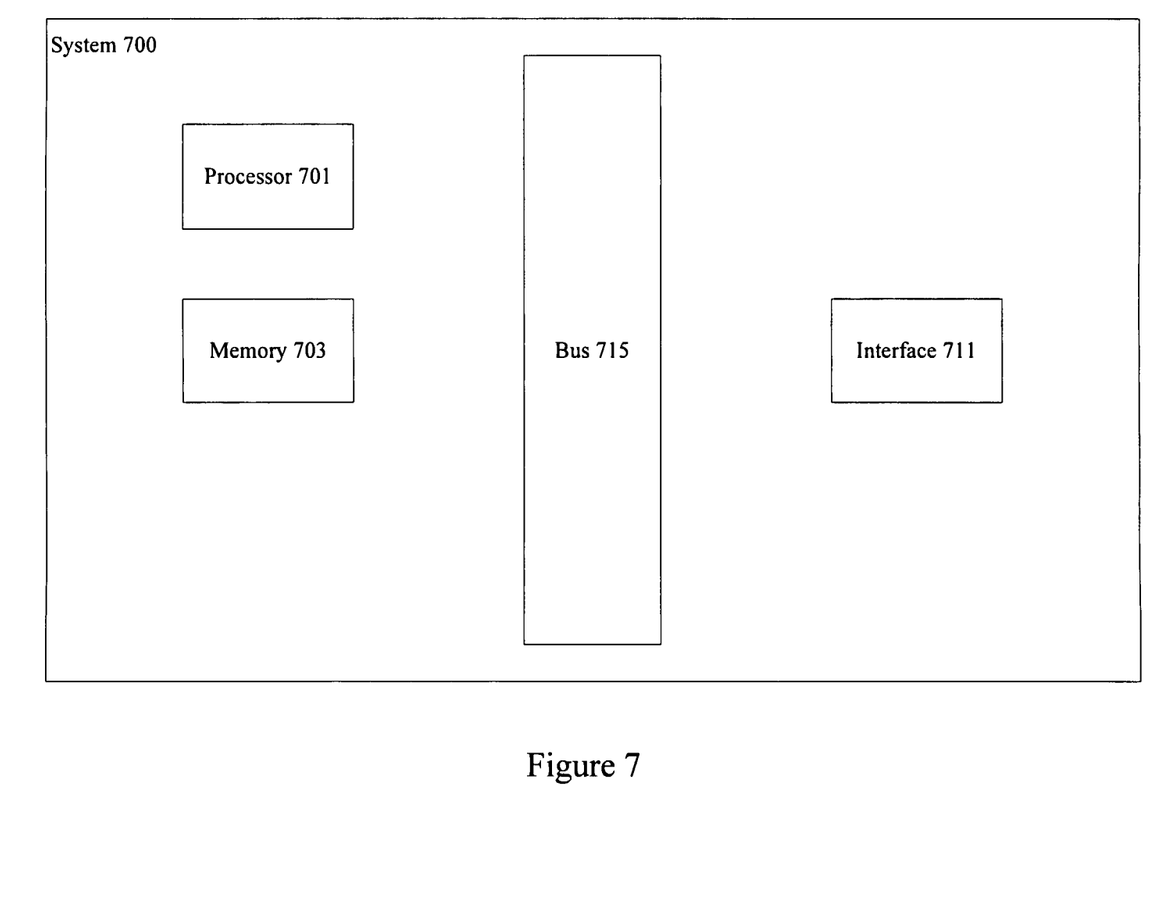
FIG. 7 illustrates one example of a streaming server.

FIG. 7 illustrates one example of a streaming server. According to particular embodiments, a system 700 suitable for implementing particular embodiments of the present invention includes a processor 701, a memory 703, an interface 711, and a bus 715 (e.g., a PCI bus or other interconnection fabric) and operates as a streaming server. A state machine can be implemented using processor 701, memory 703, and some form of persistent storage. When acting under the control of appropriate software or firmware, the processor 701 is responsible for modifying and transmitting data to a client. Various specially configured devices can also be used in place of a processor 701 or in addition to processor 701. The interface 711 is typically configured to end and receive data packets or data segments over a network.

Particular examples of interfaces supports include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to various embodiments, the system 700 is a streaming server, a guide generator, a playlog system, or a content provider management tool. The system 700 maintains a state machine synchronized with the state of other scheduling consumers. The streaming server may also include a transceiver and streaming buffers. The content server may also be associated with subscription management, logging and report generation, and monitoring capabilities. In particular embodiments, functionality for allowing operation with mobile devices such as cellular phones operating in a particular cellular network and providing subscription management. According to various embodiments, an authentication module verifies the identity of devices including mobile devices. A logging and report generation module tracks mobile device requests and associated responses. A monitor system allows an administrator to view usage patterns and system availability. According to various embodiments, the content server 791 handles requests and responses for media content related transactions while a separate streaming server provides the actual media streams.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

The invention claimed is:

1. A method, comprising:
receiving a first scheduling event from a content management system, the first scheduling event received at a streaming server, wherein the first scheduling event is timestamped by a commitment interval chosen to be long enough to exceed a latency of a scheduling event delivery mechanism of the first scheduling event;
receiving a second scheduling event from an advertising system, the second scheduling event received at the streaming server, wherein the second scheduling event is timestamped by a commitment interval chosen to be long enough to exceed a latency of a scheduling event delivery mechanism of the second scheduling event;
identifying priority associated with the first and second scheduling events;
updating a playlist for a channel associated with the first and second scheduling events;
obtaining a plurality of clips identified in the playlist;
transmitting the plurality of clips to a plurality of client devices using an updated playlist.

2. The method of claim 1, further comprising receiving a third scheduling event from an advertising system, the third scheduling event received at a guide generator.

3. The method of claim 2, further comprising receiving a fourth scheduling event from an emergency broadcast system, the fourth scheduling event received at a playlog.

4. The method of claim 1, wherein the playlist is managed using a state machine with persistent store.

5. The method of claim 1, wherein a plurality of state machines in a plurality of scheduling consumers are synchronized.

6. The method of claim 1, wherein a plurality of scheduling producers independently manage the playlist for the channel.

7. The method of claim 1, wherein the first scheduling event comprises a playlist entry, a time interval, and a duration.

8. The method of claim 1, wherein the first scheduling event comprises trafficking rules and actions to modify an existing playlist.

9. A system, comprising:
an interface operable to receive a first scheduling event from a content management system and a second scheduling event from an advertising system, wherein the first scheduling event is timestamped by a commitment interval chosen to be long enough to exceed a latency of a scheduling event delivery mechanism of the first scheduling event and the second scheduling event is timestamped by a commitment interval chosen to be long enough to exceed a latency of a scheduling event delivery mechanism of the second scheduling event;
a processor operable to identify priority associated with the first and second scheduling events and update a playlist for a channel associated with the first and second scheduling events, wherein the processor is further operable to obtain a plurality of clips identified in the playlist and transmit the plurality of clips to a plurality of client devices using an updated playlist.

10. The system of claim 9, wherein the first and second scheduling events are received at a streaming server.

11. The system of claim 9, wherein a third scheduling event is received at a guide generator.

12. The system of claim 9, wherein a fourth scheduling event is received at a playlog.

13. The system of claim 9, wherein the playlist is managed using a state machine with persistent store.

14. The system of claim 9, wherein a plurality of state machines in a plurality of scheduling consumers are synchronized.

15. The system of claim 9, wherein a plurality of scheduling producers independently manage the playlist for the channel.

16. The system of claim 9, wherein the first scheduling event comprises a playlist entry, a time interval, and a duration.

17. The system of claim 9, wherein the first scheduling event comprises trafficking rules and actions to modify an existing playlist.

18. A non-transitory computer readable storage medium comprising:
computer code for receiving a first scheduling event from a content management system, the first scheduling event received at a streaming server, wherein the first scheduling event is timestamped by a commitment interval chosen to be long enough to exceed a latency of a scheduling event delivery mechanism of the first scheduling event;
computer code for receiving a second scheduling event from an advertising system, the second scheduling event received at the streaming server, wherein the second scheduling event is timestamped by a commitment interval chosen to be long enough to exceed a latency of a scheduling event delivery mechanism of the second scheduling event;
computer code for identifying priority associated with the first and second scheduling events;
computer code for updating a playlist for a channel associated with the first and second scheduling events;
computer code for obtaining a plurality of clips identified in the playlist;
computer code for transmitting the plurality of clips to a plurality of client devices using an updated playlist.

19. The non-transitory computer readable storage medium of claim 18, further comprising computer code for receiving a third scheduling event from an advertising system, the third scheduling event received at a guide generator.

20. The non-transitory computer readable storage medium of claim 19, further comprising computer code for receiving a fourth scheduling event from an emergency broadcast system, the fourth scheduling event received at a playlog.

* * * * *